United States Patent [19]

Wong et al.

[11] Patent Number: 5,723,179
[45] Date of Patent: Mar. 3, 1998

[54] METHOD AND COMPOSITION FOR OBTAINING WATERFAST IMAGES FROM INK JET INKS

[75] Inventors: Raymond W. Wong; James McConnell Duff, both of Mississauga, Canada

[73] Assignee: Xerox Corporation, Stamford, Conn.

[21] Appl. No.: 783,590

[22] Filed: Jan. 13, 1997

[51] Int. Cl.[6] .............. B05D 5/04; B05D 1/36; B05D 1/02
[52] U.S. Cl. .............. 427/258; 427/256; 427/402; 427/419.8; 427/421; 427/426; 347/100
[58] Field of Search .............. 427/256, 258, 427/402, 419.8, 421, 426; 106/31.27; 347/100

[56] References Cited

U.S. PATENT DOCUMENTS

| | | | |
|---|---|---|---|
| 4,719,083 | 1/1988 | Baker et al. | 422/15 |
| 4,737,190 | 4/1988 | Shimada et al. | |
| 5,007,963 | 4/1991 | Erkens et al. | 106/433 |
| 5,156,675 | 10/1992 | Breton et al. | |
| 5,169,437 | 12/1992 | You | |
| 5,207,824 | 5/1993 | Moffatt et al. | |
| 5,225,300 | 7/1993 | Tsubota et al. | 430/106 |
| 5,230,733 | 7/1993 | Pawlowski | |
| 5,474,843 | 12/1995 | Lambert et al. | 428/327 |
| 5,488,402 | 1/1996 | Shields et al. | 347/96 |
| 5,518,534 | 5/1996 | Pearlstine et al. | 106/20 R |
| 5,555,008 | 9/1996 | Stoffel et al. | 347/100 |
| 5,618,338 | 4/1997 | Kurabayashi et al. | 106/26 R |

FOREIGN PATENT DOCUMENTS 63-299971 A  12/1988  Japan.

*Primary Examiner*—Shrive Beck
*Assistant Examiner*—Michael Barr
*Attorney, Agent, or Firm*—Oliff & Berridge, P.L.C.

[57] ABSTRACT

A method for use with dye-based ionic ink jet inks is disclosed whereby the ink jet ink becomes substantially waterfast upon application to a print substrate. The method includes treating a print substrate with a precipitant composition and jetting an ionic ink jet ink onto the print substrate, wherein the precipitant composition includes water and an ionic precipitant of opposite ionic charge from the ionic ink jet ink. The print substrate may be treated during formation of the print substrate or after formation of the print substrate and before jetting the ionic ink jet ink onto the print substrate. By this method, the ionic precipitant composition reacts with the oppositely charged ionic ink jet ink to form a precipitant on the print substrate that is substantially waterfast.

27 Claims, No Drawings

METHOD AND COMPOSITION FOR OBTAINING WATERFAST IMAGES FROM INK JET INKS

BACKGROUND OF THE INVENTION

This invention relates to a method and composition for treating a print substrate for receiving ink from an ink jet, producing a waterfast adhesion of ink to the print substrate. More particularly, this invention results in excellent waterfastness of an ink after printing with an ink jet onto such a treated print substrate.

Ink jet printing is a non-impact printing method that produces droplets of ink that are deposited on a substrate such as paper or transparent film in response to an electronic digital signal. Thermal or bubble jet drop-on-demand ink jet printers have found broad application as output for personal computers in the office and in the home.

Ink jet printing processes and apparatus for such processes are well known in the art. In thermal ink jet printing processes, the printer typically employs a resistor element in a chamber provided with an opening for ink to enter from a plenum. The plenum is connected to a reservoir for storing the ink. A plurality of such resistor elements is generally arranged in a particular pattern, called a primitive, in a printhead. Each resistor element is associated with a nozzle in a nozzle plate, through which ink is expelled toward a print substrate, such as paper. The entire assembly of printhead and reservoirs comprises an ink jet pen. In operation, each resistor element is connected via a conductive trace to a microprocessor, where current-carrying signals cause one or more selected elements to heat up. The heating creates a bubble of ink in the chamber, which is expelled through the nozzle toward the print substrate. In this way, firing of a plurality of such resistor elements in a particular order in a given primitive forms alpha numeric characters, performs area-fill, and provides other print capabilities on the print substrate. The thermal ink jet printing process is described in more detail, for example, in U.S. Pat. Nos. 5,169,437 to You and 5,207,824 to Moffatt et al., the entire disclosures of which are incorporated herein by reference.

It is necessary that the ink being used in this process meet stringent various performance characteristics. Such performance characteristics are generally more stringent than those for other liquid ink applications, such as for writing instruments (e.g., a fountain pen, felt pen, etc.). In particular, the following conditions are generally required for inks utilized in ink jet printing processes:

(1) the ink should possess liquid properties such as viscosity, surface tension and electric conductivity matching the discharging conditions of the printing apparatus, such as the form and material of printhead orifices, the diameter of orifices, etc.;

(2) the ink should be capable of being stored for a long period of time without causing clogging of printhead orifices during use;

(3) the recording liquid should be quickly fixable onto recording media, such as paper, film, etc., such that the outlines of the resulting ink dots are smooth and there is minimal blotting of the dotted ink;

(4) the resultant ink image should be of high quality, such as having a clear color tone and high density. The ink image should also have high gloss and high color gamut;

(5) the resultant ink image should exhibit excellent waterfastness (water resistance) and lightfastness (light resistance);

(6) the ink should not chemically attack, corrode or erode surrounding materials such as the ink storage container, printhead components, orifices, etc.;

(7) the ink should not have an unpleasant odor and should not be toxic or inflammable; and (8) the ink should exhibit low foaming and high pH stability characteristics.

Various inks for ink jet printing processes are known in the art. For example, various ink jet inks are disclosed in U.S. Pat. Nos. 4,737,190 to Shimada et al. and 5,156,675 to Breton et al. Generally, the ink jet inks of the prior art are aqueous inks, comprising a major amount of water, a humectant and/or a co-solvent, and a dye. By selecting specific humectants, dyes, or other components, it is possible to adjust the print characteristics of the resultant ink.

Although numerous ink jet inks are presently available, they generally do not meet all of the above-described requirements, while also providing excellent print quality on plain paper. In particular, the inks generally used in ink jet printing processes, while producing acceptable print quality, do not produce the high print quality that is achieved by using dry toner compositions, such as in electrostatographic imaging processes. Particularly, because these inks are generally waterbased, there is a problem of waterfastness.

Great effort has been expended in attempts to provide both dye-based and pigment-based ink jet inks having acceptable waterfastness while maintaining other desirable characteristics. However, there continues to be a demand for inks having all of the above-mentioned desirable characteristics.

The need continues to exist in the ink jet industry for improved ink jet inks that satisfy the above-described requirements while providing high quality, waterfast prints on a wide variety of recording media, including plain paper. Although some currently available ink jet inks may provide waterfast images with better substrate latitude, the inks are unacceptable in that they generally smear and have poor latency and maintainability characteristics. In addition, such inks are generally difficult to manufacture. Thus, there is still a need in the ink jet ink industry for improved waterfast black and colored inks that can be easily prepared and obtained at a lower cost.

There are several possible ways in which waterfastness can be achieved. One is through modification of the dye using complex organic synthesis. This method involves great amounts of chemical research, and therefore increased costs. An example of a synthetic dye is U.S. Pat. No. 5,230,733 to Pawlowski, wherein the dye is maintained at a basic pH in solution. When printed, the dye is neutralized by contact with the paper, causing lactone or lactim ring formation. The resulting dye is substantially waterfast on the paper. A second method used to achieve waterfastness is the use of pigments as colorants. While pigments are used in inks for ink jet printing, none to date have shown truly satisfactory adhesion to the print substrate. Third, hot melt inks can be employed. However, these inks generally have problems with pile height and are not abrasion resistant. Fourth, additives may be added to improve the interaction between the ink, specifically the dye and/or pigment, and the paper. However, it has been found that many additives are not compatible with the ink jet ink formulations.

This invention proposes a method for obtaining waterfast images by interaction of ionic dyes and precipitants of opposite ionic charge from the dye. Most ink jet inks are anionic, so that a cationic precipitant composition is used in the method. However, there are some cationic ink jet inks for which anionic precipitant compositions may be used in the method.

SUMMARY OF THE INVENTION

The method of the present invention is used to promote waterfastness in ink jet inks once applied to a print substrate. Specifically, this invention provides a method for providing a waterfast image by treating the print substrate which will receive the ionic dye-based ink jet ink with a precipitant composition of opposite ionic charge. The composition reacts with the ink to precipitate the dye out of the ink and provide the substantially waterfast image on the print substrate.

DETAILED DESCRIPTION OF PREFERRED EMBODIMENTS

The precipitant composition for treating an ink receiving print substrate comprises a solution containing at least a large ionic precipitant composition and water. The solution may further include butyl carbitol to control the surface tension of the solution. Other solvents such as glycol ethers or alcohols can also be used. Examples of such solvents include propylene glycol methyl ether and isopropanol.

The large ionic precipitant composition may be either cationic or anionic, depending on whether the dye is anionic or cationic, respectively. The precipitant composition must be of opposite ionic charge from the dye.

Both anionic and cationic dyes are well known for use in ink jet inks. Most ink jet ink dyes are anionic; however, cationic dyes may also be used. Anionic dyes are those in which a negative charge is localized on one atom or spread over the entire molecule. Cationic dyes are those in which a positive charge is localized on one atom or spread over the entire molecule.

Examples of suitable anionic dyes include a large number of water soluble acid and direct dyes. Specific examples of anionic dyes include the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), and Pro-Jet Yellow 1-G Direct Yellow 132); Aminyl Brilliant Red F-B (Sumitomo Chemical Co.); the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF VP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), and Duasyn Acid Blue AE-SF VP344 (Acid Blue 9); mixtures thereof; and the like. Further examples include Tricon Acid Red 52, Tricon Direct Red 227 and Tricon Acid Yellow 17 (Tricon Colors Incorporated), Bernacid Red 2BMN, Pontamine Brilliant Bond Blue A, BASF X-34, Pontamine, Food Black 2, Catodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Catodirect Yellow RL (Direct Yellow 86, Carolina Color and Chemical), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof, and the like.

Examples of cationic dyes include the following from Crompton & Knowles Corp: Sevron Yellow L200 200%, Sevron Brillian Red 4G 200%, Sevron Briliant Red B 200%, Sevron Blue 2G, Sevron Black B1, Basic Black PSr, and Basic Black RX. Other cationic dyes may also be suitable for use in this invention.

If the dye is anionic, as most dyes for use in ink jet inks are, then the precipitant composition preferably contains a large cationic precipitant. The precipitant cation should have a weight average molecular weight between about 70 and 2000. Preferably, the precipitant should have a weight average molecular weight between about 200 and about 1600. The precipitant may be singly or multiply charged. The cation should have a small counter ion (or multiple ions) such as chloride, bromide, hydroxide or acetate. The key defining feature of the precipitant is that it be soluble in water or typical thermal ink jet ink solvent compositions when combined with its small negative counterion (or ions). However, when it comes in contact with the anionic dye in an ink, it reacts to form an insoluble ion pair.

The cationic precipitant may be a cationic salt, including metals such as iron, aluminum, calcium, zinc, magnesium, barium, tin, etc., a phosphonium salt, a sulfonium salt, an ammonium salt, or an aluminum salt such as chlorohydrol $[Al_{13}O_4(OH)_{24}(H_2O)_{12}]^{7+}$ (commercially available from Reheis Chemical) or its bromine analog, bromhydrol. Preferably, the cationic precipitant is one or more of the following: mono-, di-, tri-, or tetra-alkyl ammonium, phosphonium or arsonium halides, where alkyl represents groups containing from 1 to about 18 carbon atoms and halide represents chlorine or bromine; mono-, di-, tri- and tetra-aryl ammonium, phosphonium and arsonium halides where aryl denotes phenyl; substituted phenyl, mono-, di-, tri-, and tetra-aralkylammonium, phosphonium and arsonium halides, where aralkyl denotes groups such as benzyl, phenethyl and the like; and mixed di-, tri- and tetra-substituted ammonium, phosphonium and arsonium halides wherein the substituents can be mixtures of the aforementioned alkyl, aryl and aralkyl groups. Particularly effective precipitants are the multiply charged complex haloaluminum hydrates such as chlorohydrol and bromhydrol, both of which possess seven negative charges and are readily available commercially.

If the dye is cationic, then the composition preferably contains a large anionic precipitant. The precipitant should have a weight average molecular weight of between about 100 and 2000, and could contain a single or multiple negative charges. Preferably, the precipitant has a weight average molecular weight between about 300 and about 1000. As in the case of the aforementioned cationic precipitants, the key requirement is that the anion be soluble in water or an ink vehicle in the form of its salt with a small counterion such as lithium, sodium, potassium or ammonium ion. However, the anionic precipitant reacts with the cationic dye to form an insoluble ion pair.

The anionic precipitant composition may include a large monoanionic salt, such as lithium, sodium, potassium, or ammonium tetraphenylborate, or a doubly charged complex such as ammonium molybdate, sodium molybdate, potassium molybdate, or ammonium, sodium or potassium iron (II) sulfate hexahydrate.

The large ionic salt of the precipitant composition is soluble in water or an ink vehicle because of the effect of its small counterions. The large ionic salt reacts with the oppositely charged large dye molecule of the ink jet ink (which is similarly soluble in the ink vehicle because of its small counterions), precipitating a water-insoluble complex onto the print substrate. This forms a print image which is substantially waterfast. It is well-known that salts composed of two relatively large ions are generally insoluble in water even though the individual ions may be soluble in the presence of small counterions such as chloride, bromide, hydroxide or acetate in the case of large cations, or lithium, sodium, potassium and ammonium in the case of large anions. In the case of multiply charged ions, this effect can be even more pronounced because more than one dye molecule can react with the same precipitant ion. It is for this reason that chlorhydrol, which has seven negative charges per ion, is a particularly effective precipitant for anionic dyes such as Food Black 2.

In the method, the precipitant composition of opposite ionic charge from the ink jet ink can be coated onto the print substrate in several different ways.

First, the print substrate may be pre-treated with the composition during formation. In this manner, the print substrate is simply used normally in the ink jet printing process. Upon application of the ionic ink, the ink reacts with the oppositely charged ionic composition to precipitate out a water-insoluble complex. For example, if the substrate is paper, the precipitant may be added during formation of the paper, either with the slurry or with the sizing applied after the paper is formed.

The composition may also be pre-coated on a formed print substrate by various methods such as dipping the substrate in an aqueous solution of the precipitant or by use of a coating rod or a slot die before application of the ink.

The print substrate can also be treated by spraying the ionic composition from an auxiliary ink jet in the ink jet printing apparatus. The ionic composition may be jetted from an auxiliary ink jet either before or after applying the ink to the print substrate, thereby forming the printed image. The ink jet ink is applied in a conventional manner using the main ink jets.

The method of the present invention provides the benefit of making dye-based ink jet inks substantially waterfast. This benefit is provided while maintaining the freedom to adjust the ink jet ink composition to achieve other desired characteristics, such as lightfastness, low product cost, high image resolution, excellent print quality on a variety of substrates, excellent jetting capability with high drop velocity, longer latency, larger drop mass or drop volume that provide optimal optical density in a single pass, high frequency response to allow for high speed (> about 50 pages per minute, exceeding the speed of the current commercial thermal ink jet printers) and high resolution printing, excellent printhead recoverability and maintainability, excellent ink stability, and a lack of printhead kogation (or undesired heater deposit or degradation in jetting performance).

Therefore, the method of providing waterfastness to dye-based ink jet ink images is achieved in a relatively cost-effective manner. There is no need to develop a special ink jet ink for use in a method of obtaining waterfast images. Commercially available ink jet inks will benefit from this invention by having increased waterfastness on a wide variety of print substrates.

Any suitable substrate for use with ink jet inks can be used in this method. For example, papers with or without coatings and plastics for use in over-head projection may be used.

The invention will now be further described with reference to specific preferred embodiments thereof. All parts and percentages are by weight of the overall precipitant composition or ink unless otherwise indicated.

EXAMPLES

Waterfastness of images formed using the invention is determined by immersing a portion of a print solid area in water for two minutes. The optical density (o.d.) of the image area before and after washing is measured. The percentage of waterfastness is defined as:

$$\% \text{ waterfastness} = \frac{o.d.i. \text{ after wash} - o.d.p. \text{ after wash}}{o.d.i. \text{ before wash} - o.d.p. \text{ before wash}}$$

wherein o.d.i. is the optical density of the image, and o.d.p. is the optical density of the paper.

A few different combinations of ionic solution and ink are prepared for testing as follows:

Example A

Solution 1: a cationic solution containing 5% by weight of solution of chlorohydrol (available from Reheis Chemical) and 5% by weight of solution butyl carbitol in water is prepared.

Ink 1: An anionic ink jet ink is prepared with the following formulation:

| | |
|---|---|
| Food Black No. 2 (Bayer) | 7.5% |
| butyl carbitol | 10.8% |
| glycerol | 7.2% |
| Cyclohexyl pyrrolidinone | 2.0% |
| polyethylene oxide (wt. avg. MW:18500) | 0.03% |
| water | 72% |

Using an HP DeskJet 500 printer, solution 1 is jetted onto an image area of the substrate. Ink 1 is subsequently imaged onto the same image area using a separate printhead. The waterfastness of the print image formed is then measured.

As the substrate, both an acid paper (pH<6) and an alkaline paper (pH>7) are used for these measurements.

Example B

An HP500C DeskJet printer is used. Solution 1 is put in one compartment while Ink 2 (composition blue) is placed in a second compartment. Images are then prepared from both jets as in Example A. Ink 2 has the following formulation:

| | |
|---|---|
| Projet Black I (direct Bk 168) (available from ICI Americas) | 3% |
| sulfolane | 28% |
| butyl carbitol | 12% |
| polyethylene oxide (wt. avg. Mw:18500) | 0.1% |
| water | 57% |

Example C

Images are formed in Example C the same as in Example B, with Solution 1 being replaced by Solution 2. Solution 2 comprises 5% by weight of solution of tetraphenylarsonium chloride hydrate and 5% by weight of solution of butyl carbitol in water.

The inks of Examples A–C were also jetted onto untreated alkaline and acid paper for comparison.

The results are shown in Table 1.

TABLE 1

| | Optical Density of Images | | | | | |
|---|---|---|---|---|---|---|
| | plain paper not treated (comparative) | | | paper treated with precipitant composition | | |
| Images on Different Papers | Before Wash | After Wash | % waterfast | Before Wash | After Wash | % waterfast |
| Ex. A: on acid paper | 1.09 | 0.63 | 58% | 1.10 | .95 | 86% |
| on alkaline paper | 1.18 | 0.69 | 58% | 1.16 | 1.08 | 92% |
| Ex. B: on acid paper | 0.95 | 0.80 | 84% | 0.98 | 0.93 | 95% |
| on alkaline paper | 0.98 | 0.88 | 90% | 0.92 | 0.93 | 101% |
| Ex. C: on acid paper | 0.87 | 0.78 | 90% | 0.84 | 0.81 | 96% |
| on alkaline paper | 0.87 | 0.84 | 96% | 0.83 | 0.86 | 104% |

As can be seen from Table 1 above, Example A has only 58% waterfastness on paper not treated with the precipitant composition. This improves to 86% on acid paper and 92% on alkaline paper treated with the precipitant composition.

Example B demonstrates relatively good waterfastness on untreated paper, but the waterfastness of Example B also improves upon treatment of the papers. Similar results are obtained with Example C.

Similar waterfastness results were also obtained using Ink 2 to image onto both alkaline and acid plain paper coated with different cation solutions as shown in Examples D–G below.

Example D

Images were formed as in Examples A–C using solution 3, a cationic solution containing 5% by weight of solution of tetraphenylphosphonium chloride 98% (Aldrich Chemical) in water. The solution was coated onto the acid or alkaline paper using a #3 coating rod.

Example E

Images were formed as in Examples A–C using solution 4, a cationic solution containing 5% by weight of solution of tetrapentyl ammonium chloride 99% (Aldrich Chemical) in water. The solution was coated onto the acid or alkaline paper using a #3 coating rod.

Example F

Images were formed as in Examples A–C using solution 5, a cationic solution containing 5% by weight of solution of tetraphenylarsonium chloride hydrate 97% (Aldrich Chemical) in water. The solution was coated onto the acid or alkaline paper using a #3 coating rod.

Example G

Images were formed as in Examples A–C using solution 6, a cationic solution containing 5% by weight of solution of aluminum chloride hexahydrate 99% (Aldrich Chemical) in water. The solution was coated onto the acid or alkaline paper using a #3 coating rod.

Using an HP DeskJet 500 printer, Ink 2 is imaged onto the acid or alkaline paper and treated with the above solutions. The waterfastness of the images is summarized in Table 2.

TABLE 2

| Example | Solution | Paper | O.D. Before Wash | O.D. After Wash | % waterfast |
|---|---|---|---|---|---|
| D | 3 | alkaline | 1.01 | 1.02 | 101 |
| | | acid | 1.04 | 1.07 | 103 |
| E | 4 | alkaline | 1.06 | 1.06 | 100 |
| | | acid | 1.08 | 1.04 | 96 |
| F | 5 | alkaline | 1.11 | 1.07 | 96 |
| | | acid | 1.03 | 1.07 | 104 |
| G | 6 | alkaline | 1.12 | 1.19 | 106 |
| | | acid | 0.97 | 1.12 | 115 |

Table 2 further demonstrates the effectiveness of large cations to improve the waterfastness of anionic inks.

What is claimed is:

1. A method for obtaining waterfast images from ink jet inks comprising:

treating a print substrate with a precipitant composition; and jetting an ionic ink jet ink onto the print substrate, wherein the precipitant composition consisting essentially of water and an ionic precipitant of opposite ionic charge from the ionic ink jet ink.

2. The method of claim 1 wherein the precipitant composition is cationic and the ink jet ink is anionic.

3. The method of claim 1 wherein the precipitant composition is anionic and the ink jet ink is cationic.

4. The method of claim 1, wherein the print substrate is selected from the group consisting of plain paper, coated paper and transparency.

5. The method of claim 2, wherein the cationic precipitant composition comprises a large cation, wherein the large cation has a weight average molecular weight of from about 70 to about 2,000.

6. The method of claim 5, wherein the large cation is selected from a cationic salt, a phosphonium salt, a sulfonium salt, an ammonium salt, and an aluminum salt.

7. The method of claim 6, wherein the cationic salt is selected from the group consisting of iron, aluminum, calcium, zinc, magnesium, barium and tin.

8. The method of claim 5, wherein the large cation is selected from the group consisting of mono-, di-, tri-, and tetra-alkyl ammonium, phosphonium or arsonium halides, where alkyl represents groups containing from 1 to about 18 carbon atoms and halide represents chlorine or bromine; mono-, di-, tri- and tetra-aryl ammonium, phosphonium and arsonium halides, where aryl denotes phenyl and substituted phenyl; mono-, di-, tri-, and tetra-aralkylammonium, phosphonium and arsonium halides, where aralkyl denotes benzyl, phenethyl; and mixed di-, tri- and tetra-substituted ammonium, phosphonium and arsonium halides, wherein the substituents can be mixtures of the aforementioned alkyl, aryl and aralkyl groups; or mixtures thereof.

9. The method of claim 6, wherein the large cation is a multiply charged complex haloaluminum hydrate.

10. The method of claim 9, wherein the complex haloaluminum hydrate is chlorhydrol or bromhydrol.

11. The method of claim 5, wherein the large cation has a weight average molecular weight of from about 200 to about 1600.

12. The method of claim 3, wherein the anionic precipitant composition comprises a large anion, wherein the large anion has a weight average molecular weight of from about 100 to about 2,000.

13. The method of claim 12, wherein the large anion is an anionic salt.

14. The method of claim 13, wherein the anionic salt is a large monoanionic salt.

15. The method of claim 14 wherein the monoanionic salt is selected from the group consisting of lithium; sodium, potassium, or ammonium tetraphenylborate; ammonium, sodium or potassium molybdate; and ammonium, sodium or potassium iron(II) sulfate hexahydrate.

16. The method of claim 12, wherein the large anion is ammonium molybdate or sodium tetraphenylboronate.

17. The method of claim 12, wherein the large anion has a weight average molecular weight of from about 300 to about 1000.

18. The method of claim 1, wherein the step of treating a print substrate comprises adding the precipitant composition when forming the print substrate.

19. The method of claim 1, wherein the step of treating a print substrate comprises jetting the precipitant composition onto the print substrate before jetting an ionic ink jet ink onto the print substrate.

20. The method of claim 1, wherein the step of treating a print substrate comprises jetting the precipitant composition onto the print substrate after jetting the ionic ink jet ink onto the print substrate.

21. The method of claim 1, wherein the step of treating a print substrate comprises coating the precipitant onto the print substrate.

22. The method of claim 21, wherein the step of coating is selected from spray coating, bar coating, slot die coating, and solvent dip coating.

23. The method of claim 5, wherein the large cation is present in an amount of from about 1–50% by weight of the composition.

24. The method of claim 5, wherein the large cation is present in an amount of from about 1–10% by weight of the composition.

25. The method of claim 12, wherein the large anion is present in an amount of from about 1–50% by weight of the composition.

26. The method of claim 12, wherein the large anion is present in an amount of from about 1–10% by weight of the composition.

27. The method of claim 1, wherein the step of treating a print substrate further comprises allowing the precipitant composition to substantially dry on the print substrate.

* * * * *